United States Patent

[11] 3,593,960

| [72] | Inventor | Domer Scaramucci |
| | | 3245 S. Hattie, Oklahoma City, Okla. 73129 |
| [21] | Appl. No. | 823,378 |
| [22] | Filed | May 9, 1969 |
| [45] | Patented | July 20, 1971 |

[54] DISC VALVE WITH UPSTREAM AND DOWNSTREAM SEATS
8 Claims, 6 Drawing Figs.

[52] U.S. Cl. ................................................... 251/306, 251/151, 251/315
[51] Int. Cl. ................................................... F16k 1/226
[50] Field of Search ........................................... 251/148, 151, 152, 305, 306, 308, 309, 314, 315

[56] References Cited
UNITED STATES PATENTS
3,411,746 11/1968 Scaramucci ................ 251/315
3,373,967 3/1968 Scaramucci ................ 251/148
3,471,121 10/1969 Geiselman .................. 251/308

FOREIGN PATENTS
70,924 1942 Czechoslovakia ............ 251/305
1,459,171 10/1966 France ....................... 251/305
1,505,249 11/1967 France ....................... 251/305

Primary Examiner—William R. Cline
Attorney—Dunlap, Laney, Hessin & Dougherty

ABSTRACT: A disc valve having seating surfaces formed on both the upstream and the downstream faces of the disc which sealingly mate with respective upstream and downstream seats disposed in the valve body when the valve is in a closed position. Various forms of valve seats are disclosed. Various methods of supporting and rotating the disc in the valve body are also disclosed.

INVENTOR.
DOMER SCARAMUCCI

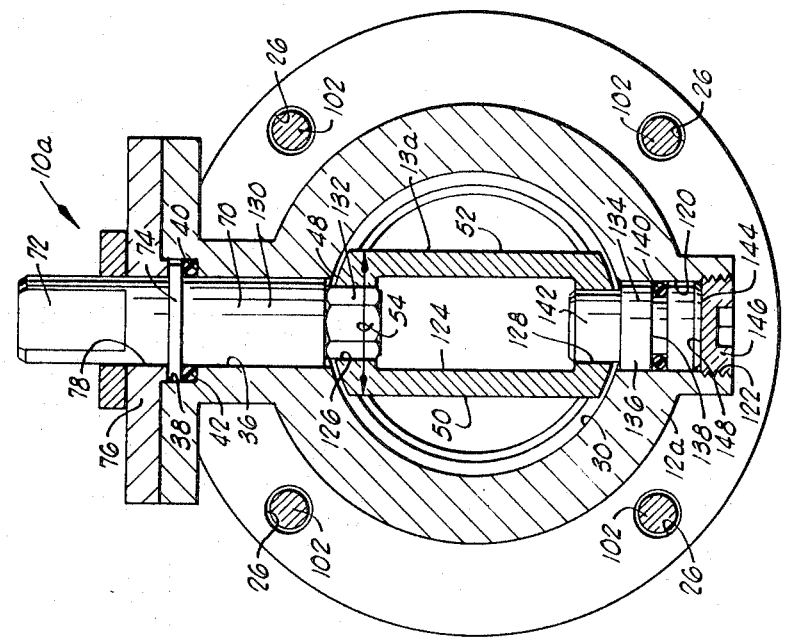

INVENTOR.
DOMER SCARAMUCCI

BY
Dunlap, Laney, Hessin & Dougherty
ATTORNEYS

DISC VALVE WITH UPSTREAM AND DOWNSTREAM SEATS

BACKGROUND OF THE INVENTION

1. Field of the Invention

This invention relates generally to improvements in disc valve assemblies, and more particularly, but not by way of limitation to an improved disc valve assembly having an upstream and a downstream seat.

2. Description of the Prior Art

Two of the most popular types of valves used in industry in recent years are known as ball valves and disc or butterfly valves.

The ball valve basically comprises a spherically shaped valve member having a port extending therethrough, which is rotatably disposed in the valve housing. The ball-type valve assembly also includes an upstream and a downstream seat assembly which seal against the respective opposite sides of the ball valve member. This double-sealing feature of the ball valve does provide a more positive sealing, and is particularly useful in applications requiring a fluidtight seal and involving the control of fluid under a high pressure. The upstream and downstream seals are generally spaced 90° apart, in order to obtain the optimum port area to ball diameter ratio. The 90° measurement is obtained by reference to the axis about which the ball valve member is rotated.

The disc valve assembly generally includes a disc-shaped valve member rotatably mounted in the bore of a valve body. The seat in the disc valve assembly is generally disposed and shaped to seal around the outer periphery of the disc valve member. This type of valve assembly does have the advantage of providing the maximum flow port area through the valve assembly with respect to a particular diameter of the disc valve member. However, since the sealing is performed by a single seal member engaging the outer periphery of the disc, the disc valve does not have the double-sealing feature of the ball valve. As a consequence, a disc valve is normally used in low-pressure applications and in applications where a certain amount of fluid leakage can be tolerated.

SUMMARY OF THE INVENTION

The present invention contemplates a valve generally comprising a body having an upstream and a downstream end face and a bore extending therethrough. A valve stem is journaled in the valve body, and extends at a right angle to the axis of the bore in the valve body. An annular seat assembly is supported in the bore of the body upstream of the valve stem, and has a seating and sealing surface formed around the inner periphery thereof. An annular seat assembly is also supported in the bore of the body downstream of the valve stem, and has a seating and sealing surface formed around the inner periphery thereof. A rigid material valve disc is supported in the valve body and is rotatably connected to the valve stem for turning the valve disc between a position in alignment with the bore through the body. The axial length of the valve disc is sized to be less than the diameter thereof. The valve disc has seating surfaces formed on opposite ends thereof and on opposite sides of the connection of the valve disc to the valve stem. The seating surfaces on the valve disc are arranged to cooperate with the upstream and downstream seat assemblies when the disc is turned to a position transverse to the axis of the bore through the valve body. The seating surfaces on the valve disc are shaped to conform to portions of a sphere having its center in the center of the disc.

An object of the invention is to provide a disc valve assembly having an upstream and a downstream seal.

A further object of the invention is to provide a valve having the service capabilities of a ball valve wherein the length of the valve body is less than for a comparable size of ball valve.

One additional object of the invention is to provide a valve having the service capabilities of a ball valve wherein the diameter of the valve body is less than required for a ball valve handling the same volume of fluid.

Yet another object of the invention is to provide a disc valve assembly having an upstream and downstream seal wherein the valve seats and seals are insertable axially in the valve body.

A still further object of the invention is to provide a disc valve assembly which is economical in construction and operation.

Other objects and advantages of the invention will be evident from the following detailed description when read in conjunction with the accompanying drawings which illustrate the various embodiments of the invention.

BRIEF DESCRIPTION OF THE DRAWINGS

FIG. 3 is a view similar to FIG. 1, but illustrating a modified valve assembly.

FIg. 4 is a view of the valve assembly of FIG. 3 as taken substantially along the lines 4-4 of FIG. 3, but with the valve disc turned to an open position.

BRIEF DESCRIPTION OF THE PREFERRED EMBODIMENTS

Figure 2:
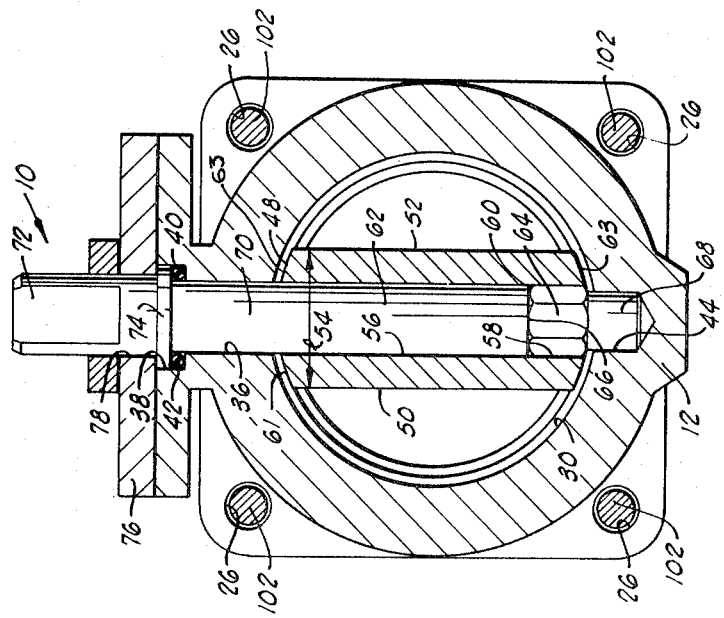
FIG. 2 is a sectional view of the valve assembly of FIG. 1, is taken substantially along the lines 2-2 of FIG. 1, but with the valve disc turned to an open position.
Figure 1:
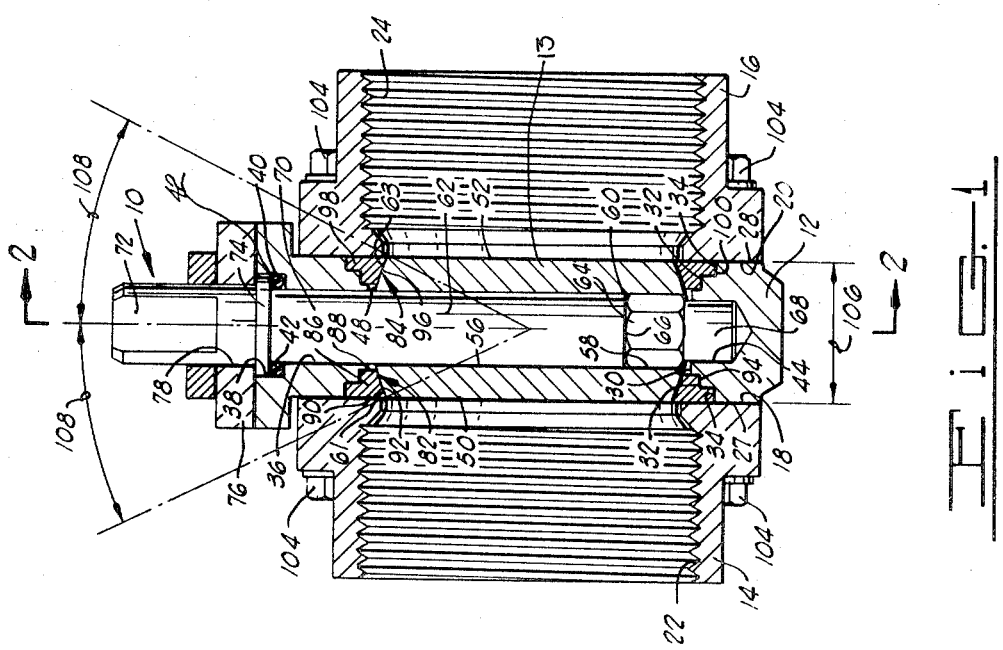
FIG. 1 is a sectional view of a valve constructed in accordance with the invention, assembled between two flanges.

Referring to the drawings in detail, and to FIGS. 1 and 2 in particular, shown therein and designated by the general reference character 10, is a disc valve assembly basically comprising a tubular valve body 12 having a disc valve member 13 rotatably disposed therein.

The valve assembly 10 is generally disposed between a pair of flanges 14 and 16. Each of the flanges 14 and 16 includes an end face 18 or 20, and a threaded opening 22 or 24 therethrough, respectively. The threaded openings 22 and 24 are axially aligned and sized to receive the threaded ends of adjacent sections of a conduit (not shown). Each of the flanges 14 and 16 also includes a plurality of circumferentially spaced apertures 26 extending therethrough.

The valve body 12 has upstream and downstream end faces 27 and 28, respectively, and a bore 30 extending therethrough. A counterbore 32 is formed in each end of the valve body 12, intersecting the respective end face 27 or 28 thereof. An additional counterbore 34 is formed in a portion of each of the counterbores 32, and each counterbore 34 is also disposed such that it intersects the respective end face 27 or 28 of the valve body 12.

An aperture 36 extends transversely through the valve body 12 intersecting the bore 30 therein. A counterbore 38 is formed in the aperture 36 adjacent the outer end thereof, thereby providing an upwardly facing surface 40 in the valve body 12. An O-ring seal member 42 is disposed in the counterbore 30, adjacent the upwardly facing surface 40.

A recess 44 is formed in the lower portion of the bore 30 of the valve body 12 and, in a preferred form, is radially aligned with the aperture 36 in the upper portion of the valve body 12.

The disc valve member 13 is rotatably disposed in the bore 30 of the valve body 12, and is constructed of a rigid material. The disc valve member 13 had an outer periphery 48, upstream and downstream end faces 50 and 52, respectively, and an axial length 54.

The axial length 54 of the disc valve member 13, as shown more clearly in FIG. 2, is the axial distance between the upstream end face 50 and the downstream end face 52, as measured generally adjacent the outer periphery 48. The axial length 54 is less than the diameter of the disc valve member 13, and is sized to enable the disc valve member 13 to cooperate with the upstream and downstream seat assemblies to provide a fluidtight seal, as will be described in more detail below. In a preferred form, the axial length 54 is about one-half the diameter of the disc 13 in about a 2-inch valve. In larger valves, the ratio of the axial length-to-diameter is decreased.

A bore 56 extends diametrically through the disc valve member 13, generally between the end faces 50 and 52 thereof. As shown more clearly in FIG. 1, a lower portion 58 of the bore 56 has a generally hexagonally shaped cross section of reduced diameter, thereby forming an upwardly facing surface 60, which encircles the inner periphery of the bore 56.

An upstream seating surface 61 is formed on a portion of the outer periphery 48 and a portion of the upstream end face 50 of the disc 13. A downstream seating surface 63 is formed on a portion of the outer periphery 48 and a portion of the downstream end face 52 of the disc valve member 13. In a preferred form, the seating surfaces 61 and 63 are shaped to conform to portions of a sphere having its center in the center of the disc valve member 13.

The valve stem 62 extends downwardly through the aperture 36 in the valve body 12, the bore 56 of the disc valve member 13, and into the recess 44 of the valve body 12. Thus, the valve stem 62 extends at a right angle to the bore 36 of the valve body 12. A portion 64 of the valve stem 62 is shaped to have a generally hexagonally shaped cross section, and is sized to matingly fit in the hexagonally shaped portion 58 of the bore 56. The hexagonally shaped portion 64 of the valve stem 62 forms a downwardly facing surface 66 which encircles the valve stem 62. In an assembled position, as shown more clearly in FIG. 1, the downwardly facing surface 66 of the valve stem 62 will engage the upwardly facing surface 60 of the bore 56, thereby limiting the downward movement of the valve stem 62 in the bore 56.

In the assembled position, a lower end portion 68 of the valve stem 62 will extend into the recess 44 of the valve body 12, and is journaled therein. An upper portion 70 of the valve stem 62 is sized to journally fit in the aperture 36 of the valve body 12. The uppermost end portion 72 of the valve stem 62 is adapted to receive and cooperate with a valve handle, or other suitable operator (not shown), for turning the valve stem 62, and thereby rotating the disc valve member 13 from a fully open to a fully closed position. As is well known in the art, various forms of valve handles and connections may be used. In one form, for example, the valve handle is connected to the upper portion 72 of the valve stem 62 by a pin, and includes a lug portion that is engageable with a pair of abutments on the valve body 12 to limit the rotational movement of the valve handle and the interconnected valve member to approximately 90°.

A flange portion 74 is formed around the valve stem 62, and is disposed generally between the upper portion 70 and the uppermost end portion 72 thereof. The flange portion 74 is sized to slidingly fit in the counterbore 38 of the valve body 12. In an assembled position, as shown more clearly in FIG. 1, the flange portion 74 will engage the O-ring 42 which is disposed in the recess 38 of the valve body 12.

A top flange 76, having an aperture 78 extending therethrough, is secured at the top of the valve body 12, such that the valve stem 70 is journaled in the aperture 78, and a portion of the top flange 76 adjacent the aperture 78 will engage the upper portion of the flange portion 74 of the valve stem 72. Thus the top flange 76 will secure the flange portion 74 compressingly against the O-ring 42, thereby providing a fluidtight seal between the valve body 12 and valve stem 62.

The counterbores 32 and 34 of the valve body 12 are provided to receive and cooperate with upstream and downstream seat assemblies 82 and 84, respectively. The upstream and downstream seat assemblies 82 and 84 are designed such that they may be constructed of an elastomeric-type material or may be of a metal construction depending on the particular application.

In a preferred form, and as shown more clearly in FIG. 1, the upstream and downstream seat assemblies 82 and 84 are of identical construction, and each includes a relatively rigid seat ring 86, having a valve member end 88 and a nonvalve member end 90. Each seat ring 86 has an inner periphery 92 and an outer periphery 94. The outer periphery 94 of each seat ring 86 is sized to slidingly fit into one of the counterbores 32. A seating surface 96 is formed on the inner periphery 92 of each seat ring 86 between the valve member end 88 and the nonvalve member end 90 thereof. Each seating surface 96 is shaped to seatingly and sealingly engage the adjacent seating surface 61 or 63 of the disc valve member 13.

A flange portion 98 extends radially from the outer periphery 94 of each seat ring 86, generally adjacent the non-valve member end 90 thereof. Each flange portion 98 has an outer periphery 100 which is sized to slidingly fit in the respective counterbore 34 of the valve body 12.

It is apparent from the foregoing that the upstream and downstream seat assemblies 82 and 84 are adapted to be insertable axially in the valve body 12. The flange portion 98 of each seat assembly 82 and 84 will engage the wall formed by the counterbore 34 in the respective end of the valve body 12 to limit the inward axial movement and to position each seat assembly 82 or 84 in the valve body 12. Each seat assembly 82 and 84 may therefore be replaced or repaired without the necessity of removing the disc valve member 13.

It is also apparent from the foregoing that the upstream seat assembly 82 is disposed in the valve body 12, generally upstream of the valve stem 62, and the downstream seat assembly 84 is disposed in the valve body 12, generally downstream of the valve stem 62.

The flanges 14 and 16 of the valve body 12 are held in an assembled relationship, as shown in FIGS. 1 and 2, by a plurality of threaded bolts 102 which extend through the apertures 26 in the flanges 14 and 16, and about the outer periphery of the valve body 12. A threaded nut 104 is disposed on each end of each of the bolts 102, and each nut 104 engages the respective flange 14 or 16.

In the assembled position, as described above, the end face 18 of the flange 14 will abut the upstream end face 27 of the valve body 12 and the nonvalve member end 90 of the upstream seat assembly 82, and the end face 20 of the flange 16 will abut the downstream end face 28 of the valve body 12 and the nonvalve member end 90 of the downstream seat assembly 84. In this manner, the flanges 14 and 16 cooperate with the valve body 12 to support and secure in position the upstream and downstream seat assemblies 82 and 84 during the operation of the valve assembly 10, as will be described below.

As shown more clearly in FIG. 1, the upstream and downstream seat assemblies 82 and 84 are spaces axially in the valve body 12, and are disposed generally on the opposite sides of the disc valve member 13. This axial spacing, or what is referred to as the seal spacing, is designated by the reference numeral 106 in FIG. 1, and is measured axially from the nonvalve member end 90 of the upstream seat assembly 82 to the nonvalve member end 90 of the downstream seat assembly 84. It is also apparent that the upstream and downstream seat assemblies 82 and 84 are disposed on opposite sides of the valve stem 62, the upstream seat assembly being upstream from the valve stem 62 and the downstream seat assembly being downstream of the valve stem 62. Each seat assembly is disposed in the valve body 12 at what may be referred to as a seal angle 108 with respect to the centerline axis of the valve stem 70, or, in other words, with respect to what may be referred to as the turning axis of the disc valve member 13. The seal angle is less than 22½° for reasons to be made more apparent below.

OPERATION OF FIGS. 1 AND 2

The turning movement of the valve operator is transmitted to the disc valve member 13 via the interconnection between the valve stem 62 and the disc valve member 13 provided by the mating fit between the hexagonally shaped portion 58 of the bore 56 and the hexagonally shaped portion 64 of the valve stem 62. The disc valve member 13 may thus be rotated from a fully closed position, that is, from a position wherein the disc valve member 13 is oriented generally in line with the bore 30 through the valve body 12, to a position wherein the disc valve member 13 is oriented generally transverse to the axis of the bore 30 through the valve body 12.

When the disc valve member 13 has been rotated to the closed position, as shown in FIG. 1, the seating surface 61 of the disc valve member 13 will seatingly and sealingly engage the seating surface 96 of the upstream seat assembly 82, and the seating surface 63 of the disc valve member 13 will seatingly and sealingly engage the seating surface 96 of the downstream seat assembly 84. Therefore, in the closed position, no fluid will flow through the valve assembly 10.

It is apparent from the foregoing that the disc valve assembly 10 provides an upstream and a downstream seal, and any fluid which may leak past the sealing engagement between the upstream seat assembly 82 and the disc valve member 13 will be effectively sealed by the sealing engagement between the upstream seat assembly 82 and the disc valve member 13 will be effectively sealed by the sealing between the downstream seat assembly 84 and the disc valve member 13. The effect of the disc valve member 13 being sealed, or rather in sealing engagement with both the upstream and downstream ends thereof assures a more positive sealing effectiveness. This particular feature of the valve assembly 10 is referred to below as a "positive double-sealing feature."

The positive double sealing is generally utilized in a ball-type valve, and to some extent in gate-type valves. It is mainly for this reason that the ball type is used in high-pressure applications requiring a fluidtight seal.

In ball valves it has been found that the optimum seal angle is 45°. In other words, using a seal angle of 45° permits the flow port area of the ball valve member to be at a maximum as compared to the diameter of the ball valve member. It should also be noted that the seal angle of 45° of course determines the seal spacing and therefore the minimum length of the housing.

The seal angle 108 of the valve assembly 10 is sized to be less than 22½°, and the axial length 54 of the disc valve member 13 is sized to be less than the diameter thereof. Therefore, in the valve assembly 10, while retaining the positive double-sealing feature, the seal angle 108 has been reduced, thereby reducing the length and the diameter valve body 12 as compared to a comparable-size ball-type valve. For example, in a typical ball valve having a 1½-inch-diameter bore or flow port therethrough, the flow port area is approximately 1.76 square inches, and the minimum seal spacing is approximately 2 inches. In the disc valve assembly 10, it has been found that the same flow area, that is 1.76 square inches, can be obtained with the seal spacing 106 of approximately seven-eighths of an inch to 1 inch. In larger sizes of valves, the space saving realized is of course, greater. Typically, a 12-inch-diameter flow in a ball-type valve requires a seal spacing of approximately 13 inches. To achieve the equivalent flow port area of the valve assembly 10, a seal spacing of only approximately 3 inches, would be required, a substantial reduction over the comparable-size ball-type valve.

The seating surfaces 96 of the upstream and downstream seat assemblies 82 and 84, respectively, are spherically shaped and sized to seatingly and sealingly engage the seating surfaces 61 and 63 of the disc valve member 13, so that when the disc valve member 13 is rotated there will be a minumum interference between the outer periphery 48 of the disc valve member 13 and the upstream and downstream seal assemblies 82 and 84, respectively, thereby reducing the amount of wear.

It is apparent form the foregoing that the valve assembly 10 provides a positive double sealing which is particularly useful in high-pressure applications, and yet maintains the size of the valve body, that is the length and diameter of the valve body, and the size of the disc valve member at a minimum, resulting in a substantial material and space saving.

EMBODIMENTS OF FIGS. 3 AND 4

The modified disc valve assembly 10a, shown in FIGS. 3 and 4, is constructed similar to the disc valve assembly 10 described above, and is adapted to be disposed between the flanges 14 and 16.

The valve body 12a is constructed exactly like the valve body 12, shown in FIGS. 1 and 2, except in lieu of the recess of the lower portion of the valve body 12a similar to the recess 44 of the valve body 12, the valve body 12a has an aperture 120 which extends through the valve body 12a intersecting the ore 30 and the outer periphery thereof. The aperture 120 is, in a preferred form, aligned with the aperture 36 in the upper portion of the valve body 12a, and has a threaded portion 122 generally adjacent the intersection thereof with the outer periphery of the valve body 12a. It should also be noted that the valve body 12a has an additional counterbore therein, as will be described below.

The disc valve member 13a is similar to the disc valve member 13, shown in FIGS. 1 and 2, except the disc valve member 13a does not have a bore extending diametrically therethrough such as the bore 56 of the disc valve member 13. The disc valve member 13a has a port opening 124 which extends therethrough, and is disposed generally between upstream and downstream end faces 50 and 52, respectively, of the disc valve member 13a. Thus, the port opening 124 is positioned such that when the disc valve member 13a has been rotated to the open position, the port opening 124 is axially aligned with the bore 30 in the valve body 12a. The port opening 124 therefore provides an additional opening through which fluid may flow when the valve assembly is in the open position.

The disc valve member 13a also includes upper and lower apertures 126 and 128, respectively. Each of the apertures 126 and 128 extends through the disc valve member 13a intersecting the outer periphery 48 and the port opening 124 thereof, and the upper and lower apertures 126 and 128 are aligned as shown in FIGS. 3 and 4. The upper aperture 126 has a hexagonally shaped cross section for reasons which will be made apparent below.

A valve stem 130 extends downwardly through the transversely extending aperture 36 of the valve body 12a, and is journaled therein. The upper portion of valve stem 130 is sized and shaped exactly like the upper portion of the valve stem 62, shown in FIGS. 1 and 2, and therefore corresponding reference numerals are used in FIGS. 3 and 4 to indicate like parts of the valve stem 130 with respect to the valve stem 62.

The lowermost end portion 132 of the valve stem 130 extends a distance into the bore 30 of the valve body 12a, and is provided to have a generally hexagonally shaped cross section which is sized to matingly and interconnectingly fit into the upper aperture 126 of the disc valve member 13a. The interconnection between the lower portion 132 of the valve stem 130 and the upper aperture 126 of the disc valve member 13a is provided to transmit the turning movement of the valve operator through the valve stem 130 to the disc valve member 13a, for opening and closing disc valve assembly 10a.

A lower valve stem 134 extends through and is journaled in the lower body aperture 120. A groove 138 encircles the lower portion 136 of the lower valve stem 134, and an O-ring 140 is disposed in the groove 138. The O-ring 140 is sized such that in an assembly position, as shown in FIGS. 3 and 4, the O-ring 140 will sealingly engage the walls of the lower aperture 128 and the lower valve stem 134, thereby forming a fluidtight seal therebetween.

An upper portion 142 of the lower valve stem 134 extends a distance into the bore 30 of the valve body 12a, and is sized and positioned, such that in an assembled position, the upper portion 142 is journaled in the lower aperture 128 of the disc valve member 13a. Also, as shown in FIGS. 3 and 4, the lower end 144 of the lower valve stem 134 is disposed a distance into the lower aperture 120 of the valve body 12a, when the lower valve stem 134 is in an assembled position.

A retaining cap 146 is threaded into the lower aperture 120 to a position wherein the upper end 148 of the retaining cap 146 engages the lower end 144 of the lower valve stem 134, thereby securing the lower valve stem 134 in an assembly position, as shown in FIGS. 3 and 4.

The counterbores 32 of the valve body 12a are provided to receive and cooperate with upstream and downstream seat assemblies 150 and 152, respectively. The upstream and downstream seat assemblies 150 and 152 are designed such that they may be constructed of an elastomeric-type material, or may be of a metal construction depending on the particular application.

The upstream and downstream seat assemblies 150 and 152, in a preferred form, are of identical construction, and each includes a relatively rigid seat ring 154, having a valve member end 156 and a nonvalve member end 158. Each seat ring 154 has an inner periphery 160 and an outer periphery 162. The outer periphery 162 of each seat ring 154 is sized to slidingly fit into one of the counterbores 32. A seating surface 164 is formed on the inner periphery 160 of each seat ring 154 between the valve member end 156 and the nonvalve member end 158 thereof. Each seating surface 164 is shaped to seatingly and sealingly engage the adjacent seating surface 61 and 63 of the disc valve member 13a.

It is apparent from the foregoing that the upstream and downstream seat assemblies 150 and 152 are adapted to be insertable axially in the valve body 12a in a manner very similar to the seat assemblies 82 and 84 of the valve assembly 10.

A metal or plastic reinforcing ring 166, having a valve member end 168, a nonvalve member end 170, and inner and outer peripheries 172 and 174, respectively, is disposed in each counterbore 34 in the respective end of the valve body 12a. The outer periphery 174 of each reinforcing ring is sized to provide a sliding fit in the respective counterbore 34.

An additional counterbore 176 is formed in each end of the valve body 12b, and an O-ring seal member 178 is disposed in each counterbore 176. Each O-ring seal member 178 is sized such that in an assembled position, as shown in FIGS. 3 and 4, one of the O-rings 178 will sealingly engage the end face 20 of the flange 16, the adjacent reinforcing ring 166, and the valve body 12a; and the other of the O-rings 178 will sealingly engage the end face 18 of the flange 14, the adjacent reinforcing ring 166 and the valve body 12a, thereby forming a fluidtight seal therebetween.

In an assembled position, the valve member end 168 of each reinforcing ring 166 will abut the nonvalve member end 158 of the respective seat ring 154 and the wall formed by the respective counterbore 34; and thereby, in cooperation with the respective flange 14 or 16, each reinforcing ring 166 will secure the respective seat ring 154 in the assembled position.

OPERATION OF FIGS. 3 AND 4

The operation of the disc valve assembly 10a is substantially the same as that described before with respect to the valve assembly 10, shown in FIGS. 1 and 2.

The turning movement of the valve stem 130 is transmitted to the disc valve member 13a via the interconnection between the valve stem 130 and the disc valve member 13a provided by the mating fit between the hexagonally shaped portion 132 of the valve stem 130 and the upper aperture 126 of disc valve member 13a. The disc valve member 13a may thus be rotated from a fully closed position, as shown in FIG. 3, to a fully open position, as shown in FIG. 4.

When the disc valve member 13a is rotated to the closed position, a sealing engagement is established between the upstream seat assembly 150 and the seating surface 61 of the disc valve member 13a, and between the downstream seat assembly 152 and the seating surface 63 of the disc valve member 13a in a manner exactly like that described with respect to the disc valve member 13, shown in FIGS. 1 and 2. Therefore, the valve assembly 10a retains the advantages of the positive double sealing as described with respect to the valve assembly 10.

The salient difference between the disc valve assembly 10 and the disc valve assembly 10a, is that the disc valve assembly 10a provides an additional flow port area when the disc valve assembly 10a is turned or rotated to the open position. The additional flow port area is defined by the flow port 124 which extends through the disc valve member 13a.

Since the flow port area through the disc valve assembly 10a is increased by the area defined by the flow port 124, it is apparent that for a given desirable flow port area, the diameter of the disc valve member 13a can be reduced, thereby reducing the size of the valve body 12a correspondingly.

Comparing the above-mentioned feature to a typical balltype valve, it has been found that a 2½-inch-diameter sphere or ball valve member is required to provide a 1.76 square inch flow port area through the valve. To provide an equivalent flow area, that is 1.76 square inches, through disc valve assembly 10a, as shown in FIGS. 3 and 4, a 2-inch-diameter disc valve member 13a is required. It is also apparent from the foregoing that the space saving, that is the reduction in diameter of the valve member compared to a given flow port area, will increase substantially as the size of the valve is increased.

The disc valve assembly 10a therefore retains the positive double-sealing feature of the valve assembly 10 combined with the reduced size of the valve body as described above, and yet provides an additional space-saving feature.

EMBODIMENT OF FIGS. 5 AND 6

Figure 6:
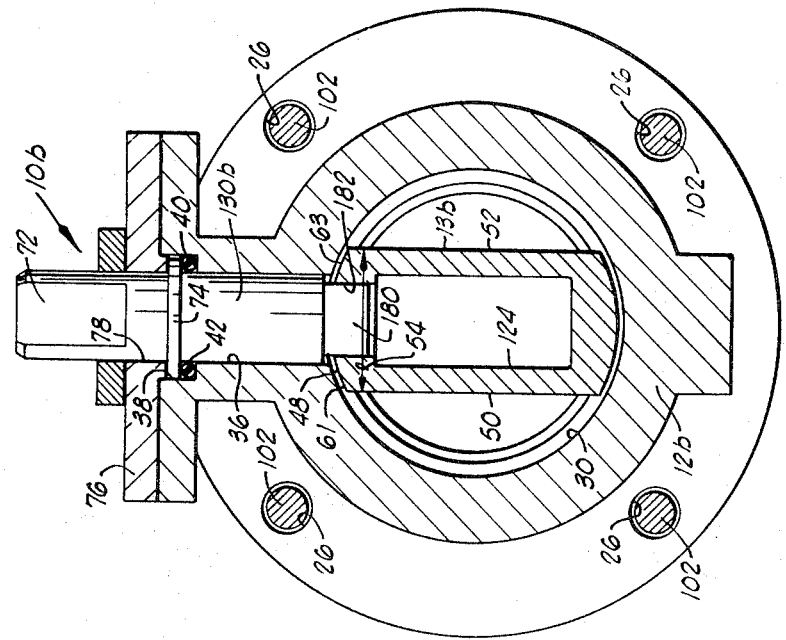
FIg. 6 is a view of the valve assembly of FIG. 5 as taken substantially along the lines 6-6 of FIG. 5, but with the valve disc turned to an open position.
Figure 5:
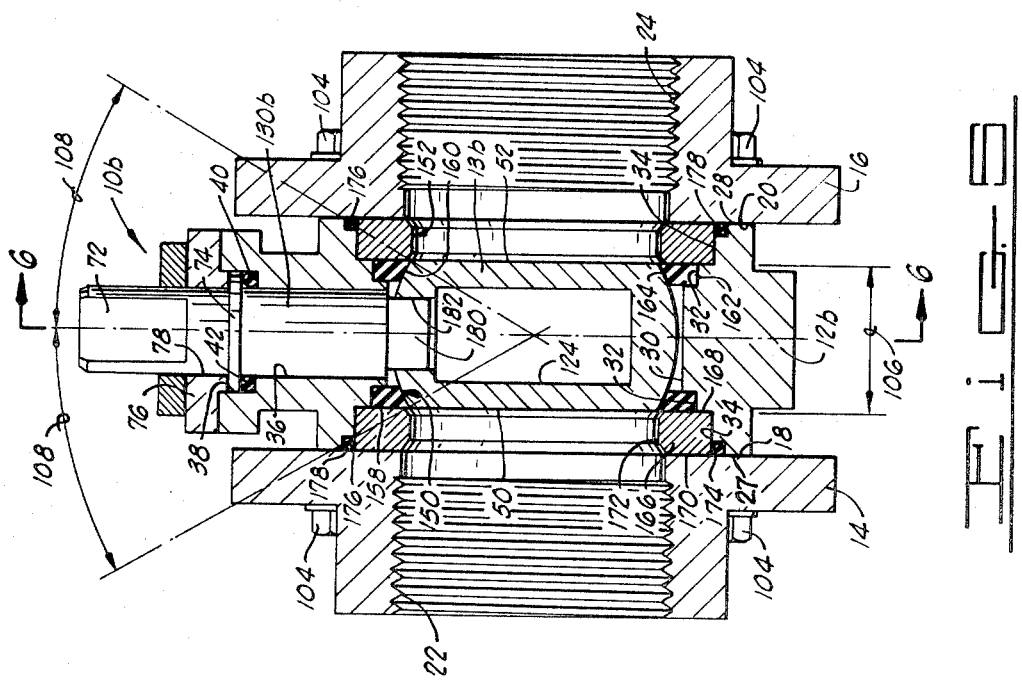
FIG. 5 is a view similar to FIG. 1, but illustrating yet another modified valve assembly.

The disc valve assembly 10b, shown in FIGS. 5 and 6, is constructed very similar to the disc valve assembly 10a, shown in FIGS. 3 and 4, and those parts which are identical are provided with corresponding reference numerals and therefore no further description of those parts is required below.

The lower portion 180 of the valve stem 130b of the valve assembly 10b is preferably rectangularly shaped rather than hexagonally shaped as was the lower portion 132 of the valve stem 130. The rectangular-shaped end 180 of the valve stem 130b extends a distance into the bore 30 of the disc valve assembly 10b, and provides the interconnection between the valve stem 130b and the disc valve member 13b, as will be described in more detail below.

The disc valve member 13b is identical to the disc valve member 13a except there are not upper and lower apertures in the disc member 13b similar to the upper and lower apertures 126 and 128 of the disc valve member 13a. A recess 182 is formed in the outer periphery 48 of the disc valve member 13b, and the recess 182 is positioned and shaped to matingly and interconnectingly receive the rectangular end 180 of the valve stem 130b. In one form, the axial length of the recess 182, when the valve assembly 10b is in the closed position, is sized to be slightly longer than the axial length of the rectangular end 180 of the valve stem 130b, to permit some axial movement of the disc valve member 13b with respect to the valve stem 130b when the valve assembly 10b is in the closed position. When constructed in this manner, it is apparent that the disc valve member 13b is of the type generally known in the art as a floating valve member.

As shown in FIGS. 5 and 6, the disc valve member 13b is not journaled in the lower portion of the valve body 12b similar to the disc valve members 13 and 13a described above. Therefore, neither a recess nor an aperture is required in the lower portion of the valve body 12b of the disc valve assembly 10b.

OPERATION OF FIGS. 5 AND 6

The disc valve assembly 10b will operate substantially the same as the disc valve assembly 10a described above, and of course may retain the advantages of the positive double-sealing feature and the space-saving feature as described with respect to the disc valve assembly 10a.

The significant difference between the disc valve assembly 10a and the disc valve assembly 10b is that the disc valve member 13b of the disc valve assembly 10b is of the floating valve member type. Therefore, when the disc valve member 13b is rotated to the closed position, a pressure differential will exist across the disc valve member 13b, and the disc valve member 13b will move downstream due to the loose interconnection between the lower rectangular end 180 of the valve stem 130 and the recess 182 of the disc valve member 13b.

As the disc valve member 13b moves downstream, the seating surface 63 of the disc valve member 13b will be moved into a tighter sealing and seating engagement with the seating surface 96 of the downstream seat assembly 152, thereby forming a fluidtight seal therebetween. Although the upstream seat assembly 150 does provide a sealing engagement with the disc valve member 13b, the substantial portion of the sealing engagement will normally be effected between the disc valve member 13b and the downstream seat assembly 152. The type of valve assembly which provides a seal as described above is generally known to the art as a downstream-seal-type valve assembly.

It is apparent from the foregoing that the disc valve assembly 10b retains all the advantages of the disc valve assembly 10a, and yet provides a disc valve assembly with a floating-type disc valve member.

It is apparent from the foregoing that the valve assemblies described herein provide a positive double sealing effected by an upstream and downstream seat assembly cooperating with a disc valve member, and yet maintain the seal spacing at a minimum. The length and diameter of the valve body is therefore considerably reduced as compared with comparable sizes of ball valves.

Changes may be made in the construction and arrangements of the parts or elements of the various embodiments as disclosed herein without departing from the spirit and scope of the invention.

What I claim is:

1. A disc valve, comprising:
   a valve body having upstream and downstream end faces and a bore extending therethrough;
   a valve stem journaled in the valve body and extending at a right angle to the axis of the bore through the valve body;
   an annular upstream seat supported in the bore of the valve body upstream of the valve stem, having a sealing surface formed around the inner periphery thereof;
   an annular downstream seat supported in the bore of the valve body downstream of the valve stem, having a sealing surface formed around the inner periphery thereof;
   a rigid material disc valve member in the valve body connected to the stem for turning movement of the disc valve member about a turning axis, between a closed position transverse to the axis of the bore through the valve body, and an open position in line with the bore through the valve body, the axial length of said disc valve member being less than the diameter thereof, said disc valve member having seating surfaces formed on the opposite ends thereof on opposite sides of the connection of the disc valve member to the stem, arranged to cooperate with the upstream and downstream seats when the disc valve member is turned to a position transverse to the axis of the bore through the valve body, both of said seating surfaces being shaped to conform to portions of a sphere having its center in the center of the disc valve member;
   wherein the valve body includes a pair of counterbores, one of the counterbores intersecting the upstream end face of the valve body, and the other of said counterbores intersecting the downstream end face of the valve body, said counterbores being provided to receive and cooperate with the upstream and downstream seats, respectively;
   wherein the upstream seat is disposed in the counterbore intersecting the upstream end face of the valve body, and wherein the downstream seat is disposed in the counterbore intersecting the downstream end face of the valve body; and wherein the upstream and downstream seats are each defined further to include, a relatively rigid seat ring having a valve member end, a nonvalve member end, an inner periphery, an outer periphery, and a seating surface formed on the inner periphery thereof between the valve member end and the nonvalve member end of the seat ring, said seating surface being sized to seatingly and sealingly engage the adjacent seating surface of the disc valve member, said outer periphery being sized to slidingly fit in the respective counterbore, said valve member end being sized to abut the wall formed by the respective counterbore to limit the axial movement and to position the seat ring in the valve body; and
   wherein the valve body is defined further to include a pair of additional counterbores, one of said counterbores intersecting the upstream end face of the valve body and the other of said counterbores intersecting the downstream end face of the valve body; and wherein each seat ring is defined further to include a flange portion extending radially therefrom adjacent the nonvalve member end thereof, said flange portion being sized to slidingly extend into the respective additional counterbore in the valve body.

2. The disc valve of claim 1 wherein the disc valve member is of a one-piece solid construction.

3. The disc valve of claim 2 wherein the disc valve member includes a bore extending diametrically therethrough, a portion of said bore having a generally hexagonally shaped cross section; and wherein the valve stem is sized to be inserted through said bore, a portion of said valve stem having a generally hexagonally shaped cross section sized to matingly fit the hexagonally shaped cross section in said bore, thereby providing the interconnection therebetween.

4. The disc valve of claim 3 wherein the valve stem is journaled in the valve body on both sides of the bore through the body.

5. The disc valve of claim 1 wherein the disc valve member includes a flow port opening extending axially therethrough, said flow port opening being positioned such that when the disc valve member is turned to the open position the flow port opening is aligned with the bore in the valve body, thereby providing an additional flow area through the disc valve.

6. The disc valve of claim 1 wherein the annular upstream seat and the annular downstream seat are positioned in the valve body at a seal angle with respect to the turning axis of the disc valve member, said seal angle being less than 45° and greater than 0°.

7. The disc valve of claim 6 wherein the seal angle is at least as small as 22½°.

8. A disc valve, comprising:
   a valve body having upstream and downstream end faces and a bore extending therethrough;
   a valve stem journaled in the valve body and extending at a right angle to the axis of the bore through the valve body;
   an annular upstream seat supported in the bore of the valve body upstream of the valve stem, having a sealing surface formed around the inner periphery thereof;
   an annular downstream seat supported in the bore of the valve body downstream of the valve stem, having a sealing surface formed around the inner periphery thereof;
   a rigid material disc valve member in the valve body connected to the stem for turning movement of the disc valve member about a turning axis, between a closed position transverse to the axis of the bore through the valve body, and an open position in line with the bore through the valve body, the axial length of said disc valve member being less than the diameter thereof, said disc valve member having seating surfaces formed on the opposite ends thereof on opposite sides of the connection of the disc valve member to the stem, arranged to cooperated with the upstream and downstream seats when the disc valve member is turned to a position transverse to the axis of the bore through the valve body, both of said seating surfaces being shaped to conform to portions of a sphere having its center in the center of the disc valve member;
   wherein the valve body includes a pair of counterbores, one of the counterbores intersecting the upstream end face of the valve body; and the other of said counterbores intersecting the downstream end face of the valve body, said counterbores being provided to receive and cooperate with the upstream and downstream seats respectively;

wherein the upstream seat is disposed in the counterbore intersecting the upstream end face of the valve body, and wherein the downstream seat is disposed in the counterbore intersecting the downstream end face of the valve body; and wherein the upstream and downstream seats are each defined further to include, a relatively rigid seat ring having a valve member end, a nonvalve member end, an inner periphery, an outer periphery, and a seating surface formed on the inner periphery thereof between the valve member end and the nonvalve member end of the seat ring, said seating surface being sized to seatingly and sealingly engage the adjacent seating surface of the disc valve member, said outer periphery being sized to slidingly fit in the respective counterbore, and said valve member end being sized to abut the wall formed by the respective counter bore to limit the axial movement and to position the seat ring in the valve body; and wherein the valve body is defined further to include a pair of additional counterbores, one of said counterbores intersecting the upstream end face of the valve body, and the other of said counterbores intersecting the downstream end face of the valve body; and a retaining ring having a valve member end disposed in each of said additional counterbores, the valve member end of each retaining ring being sized and positioned to abut the nonvalve member end of the respective seat ring to secure the respective seat ring in position.

PO-1050
(5/69)

UNITED STATES PATENT OFFICE
CERTIFICATE OF CORRECTION

Patent No. 3,593,960          Dated July 20, 1971

Inventor(s) Domer Scaramucci

It is certified that error appears in the above-identified patent and that said Letters Patent are hereby corrected as shown below:

Column 5, Line 17 "past" should be --pass--

Column 5, Lines 21 and 22 should be omitted.
Column 5, Line 23, insert the word -the- before the word "downstream"
Column 6, Line 12 "ore" should be --bore--
Column 7, Line 24 "and" should be --or--.
Column 8, Line 45 "apper" should be --aper--
Column 10, line 68 "cooperated" should be --cooperate--
Column 12, line 11 after "end" and before "disposed" insert the following --and a non-valve member end--

Signed and sealed this 25th day of January 1972.

(SEAL)
Attest:

EDWARD M. FLETCHER, JR.
Attesting Officer

ROBERT GOTTSCHALK
Commissioner of Patents